United States Patent
Perroud et al.

(10) Patent No.: US 10,920,813 B2
(45) Date of Patent: Feb. 16, 2021

(54) INSERT TO BE CRIMPED, FIXING PART AND ASSEMBLY COMPRISING ONE SUCH INSERT AND METHODS FOR MANUFACTURING SUCH PARTS

(71) Applicant: BOLLHOFF OTALU S.A., La Ravoire (FR)

(72) Inventors: Norbert Perroud, Curienne (FR); Nicolas Begel, Chambery (FR)

(73) Assignee: BOLLHOFF OTALU S.A., La Ravoire (FR)

( * ) Notice: Subject to any disclaimer, the term of this patent is extended or adjusted under 35 U.S.C. 154(b) by 527 days.

(21) Appl. No.: 15/887,100

(22) Filed: Feb. 2, 2018

(65) Prior Publication Data
US 2018/0238369 A1 Aug. 23, 2018

(30) Foreign Application Priority Data

Feb. 22, 2017 (FR) ....................... 1751385

(51) Int. Cl.
| | |
|---|---|
| *F16B 17/00* | (2006.01) |
| *F16B 19/00* | (2006.01) |
| *F16B 19/10* | (2006.01) |
| *F16B 33/00* | (2006.01) |
| *F16B 37/06* | (2006.01) |

(52) U.S. Cl.
CPC ............ *F16B 17/00* (2013.01); *F16B 19/008* (2013.01); *F16B 19/1072* (2013.01); *F16B 33/004* (2013.01); *F16B 37/067* (2013.01)

(58) Field of Classification Search
CPC .......... F16B 5/0208; F16B 5/04; F16B 5/045; F16B 17/00; F16B 19/008; F16B 19/10; F16B 19/145; F16B 19/1072; F16B 33/004; F16B 37/067; F16B 2019/1009; Y10T 403/49; Y10T 403/75
USPC ................................ 403/274, 408.1
See application file for complete search history.

(56) References Cited

U.S. PATENT DOCUMENTS

| | | | | |
|---|---|---|---|---|
| 4,033,243 | A | | 7/1977 | Kirrish et al. |
| 4,074,608 | A | * | 2/1978 | Siebol .................. F16B 19/008 411/43 |
| 4,170,919 | A | * | 10/1979 | Siebol .................. F16B 19/008 411/43 |
| 4,170,920 | A | * | 10/1979 | Siebol .................. F16B 19/008 411/43 |

(Continued)

FOREIGN PATENT DOCUMENTS

| | | |
|---|---|---|
| DE | 27 00 665 A1 | 8/1977 |
| DE | 3513644 A1 * | 10/1986 ............ F16B 37/067 |

(Continued)

*Primary Examiner* — Josh Skroupa
(74) *Attorney, Agent, or Firm* — Oliff PLC

(57) ABSTRACT

An insert to be crimped on a support includes a body having a shank extending along a longitudinal axis and including a crimping section configured to deform into a crimping bead to crimp the insert on the support, and a flange presenting a surface facing the crimping section and extending along an axis perpendicular to the longitudinal axis, the flange having a constant thickness and presenting a fold forming a groove situated on the surface and designed to receive a seal. A fixing part includes the insert and a seal housed in the groove of the insert, and a fixing assembly includes the fixing part and a support on which the fixing part is crimped.

9 Claims, 2 Drawing Sheets

(56) References Cited

U.S. PATENT DOCUMENTS

| | | | | |
|---|---|---|---|---|
| 4,182,216 | A * | 1/1980 | DeCaro | F16B 37/067 411/34 |
| 4,580,936 | A * | 4/1986 | Francis | F16B 19/008 411/38 |
| 6,283,691 | B1 | 9/2001 | Bogatz et al. | |
| 7,223,056 | B2 * | 5/2007 | Schneider | F16B 37/067 411/183 |
| 7,901,171 | B2 * | 3/2011 | Schruff | F16B 37/067 411/38 |
| 8,961,087 | B2 * | 2/2015 | Schruff | F16B 37/067 411/38 |
| 10,316,883 | B2 * | 6/2019 | Makino | F16B 37/067 |
| 10,570,946 | B2 * | 2/2020 | Linsel | F16B 19/1072 |
| 2005/0019129 | A1 | 1/2005 | Hesse et al. | |

FOREIGN PATENT DOCUMENTS

| | | | | |
|---|---|---|---|---|
| DE | 4019193 A1 * | 12/1991 | | F16B 19/008 |
| DE | 9304575 U1 * | 5/1993 | | F16B 19/008 |
| EP | 0634582 A1 * | 1/1995 | | F16B 19/008 |
| EP | 1 557 577 A2 | 7/2005 | | |
| EP | 1 953 398 A1 | 8/2008 | | |
| FR | 1080808 A * | 12/1954 | | F16B 37/067 |
| FR | 1444261 A * | 7/1966 | | F16B 19/008 |
| GB | 2120741 A * | 12/1983 | | F16B 19/008 |

* cited by examiner

INSERT TO BE CRIMPED, FIXING PART AND ASSEMBLY COMPRISING ONE SUCH INSERT AND METHODS FOR MANUFACTURING SUCH PARTS

BACKGROUND OF THE INVENTION

The invention relates to inserts to be crimped on a support, and more particularly to the tightness between an insert and a support.

STATE OF THE ART

Inserts to be crimped on a support and seals suitable for the inserts are currently used to ensure the tightness between the insert and the support.

Inserts having a shank, a flange, also called bearing head, and a seal over-moulded on the insert can for example be cited. Such a seal is deposited around the shank and underneath the head of the insert, and it is securely attached to the insert. However, the seal is fragile and may be damaged when the insert is inserted in its destination housing. Furthermore, such a seal can come off when the insert is mounted on a support. Indeed, mounting of the inserts can generate vibrations and frictions which tend to make the seal move resulting in a loss of the required tightness. This phenomenon is further amplified when the inserts are lubricated for the requirements of the automobile industry or when, after they have been placed, the inserts are subjected to surface treatments in a high-temperature bath, or have paint or varnish applied to them.

Other inserts to be crimped can also be cited which have a flange and an O-ring placed under the flange and around the shank of the insert. Inserts can further be cited which have a flange provided with a groove located under the head in order to house a seal. But these inserts do not provide sufficient strength for the support. Indeed, the insert crimped on the support does exert a pressure on the seal which deforms due to its elasticity, but which, due to a spring effect, transmits forces perpendicular to the surface of the support which tend to make the flange lift off slightly from the surface of the support. Due to the vibrations encountered during use of the insert crimped on the support, nuisance lift-off of the insert can occur, characterized mechanically by a loss of securing in the assembly.

OBJECT OF THE INVENTION

One object of the invention consists in remedying these shortcomings, and more particularly in providing particularly suitable means to obtain an efficient strength between an insert and a support.

Another object of the invention is to provide means for guaranteeing an efficient tightness between the insert and the support.

According to one feature of the invention, an insert to be crimped on a support is proposed comprising a body having:
- a shank extending along a longitudinal axis and comprising a crimping section configured to deform into a crimping bead to crimp the insert on the support, and
- a flange presenting a surface facing the crimping section and extending along an axis perpendicular to the longitudinal axis.

The flange has a constant thickness and presents a fold forming a groove situated on the surface and designed to receive a seal.

Contact is thus guaranteed between the flange and the support to ensure an efficient strength of the insert on the support. An insert suitable for housing a seal guaranteeing contact of the flange with the support is further provided.

The surface can have a first part on which the groove is situated and a second part located at one end of the flange opposite the shank, the second part being situated in front of the first part with respect to the orientation of the surface.

The thickness of the flange can be greater than or equal to 0.5 mm and strictly less than 2 mm.

According to another feature of the invention, a fixing part is proposed comprising an insert as defined in the foregoing, and a seal housed in the groove of the insert.

According to another feature of the invention, a fixing assembly is proposed comprising a fixing part as defined in the foregoing, and a support on which the fixing part is crimped.

The support can have a thickness comprised between 0.5 and 8 mm inclusive.

According to other features of the invention, methods for manufacturing parts as defined in the foregoing are proposed.

A method for manufacturing an insert to be crimped on a support is therefore proposed comprising a step in which an insert is provided comprising a body having:
- a shank extending along a longitudinal axis and comprising a crimping section configured to deform into a crimping bead to crimp the insert on the support, and
- a flange presenting a surface facing the crimping section and extending along an axis perpendicular to the longitudinal axis.

The method comprises a folding step of the flange so as to keep a constant thickness of the flange and to form a groove situated on the surface.

A method for manufacturing a fixing part is also proposed comprising manufacturing of an insert as defined in the foregoing, and a housing step of a seal in the groove of the insert.

A method for manufacturing a fixing assembly is also proposed comprising manufacturing of a fixing part as defined in the foregoing and a crimping step of the fixing part on a support.

BRIEF DESCRIPTION OF THE DRAWINGS

Other advantages and features will become more clearly apparent from the following description of particular embodiments and implementations modes of the invention given for non-restrictive example purposes only and represented in the appended drawings, in which.

DETAILED DESCRIPTION

Figure 1:
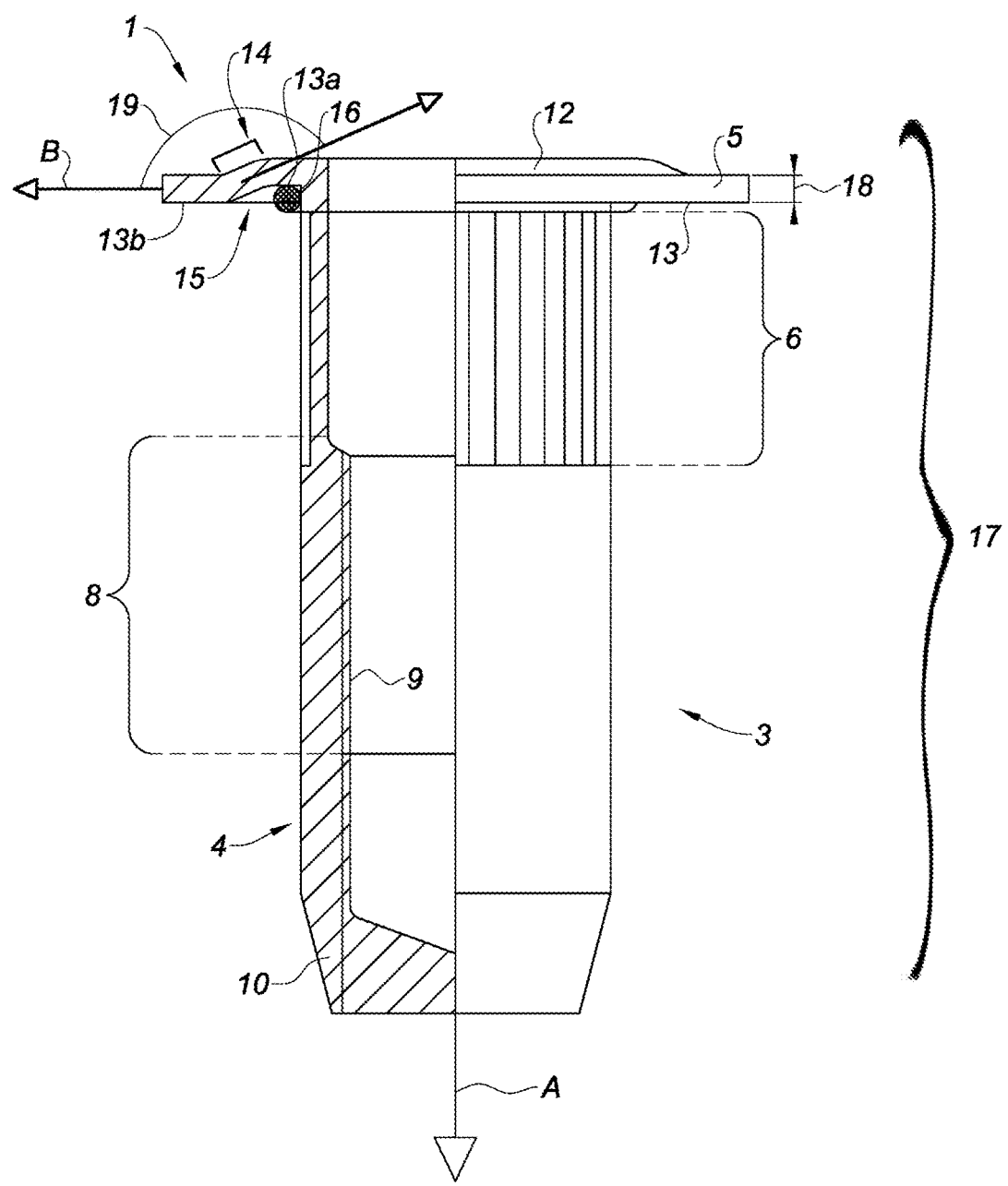
FIG. 1 schematically illustrates a cross-sectional view of an embodiment of an insert to be crimped according to the invention before crimping.
Figure 2:
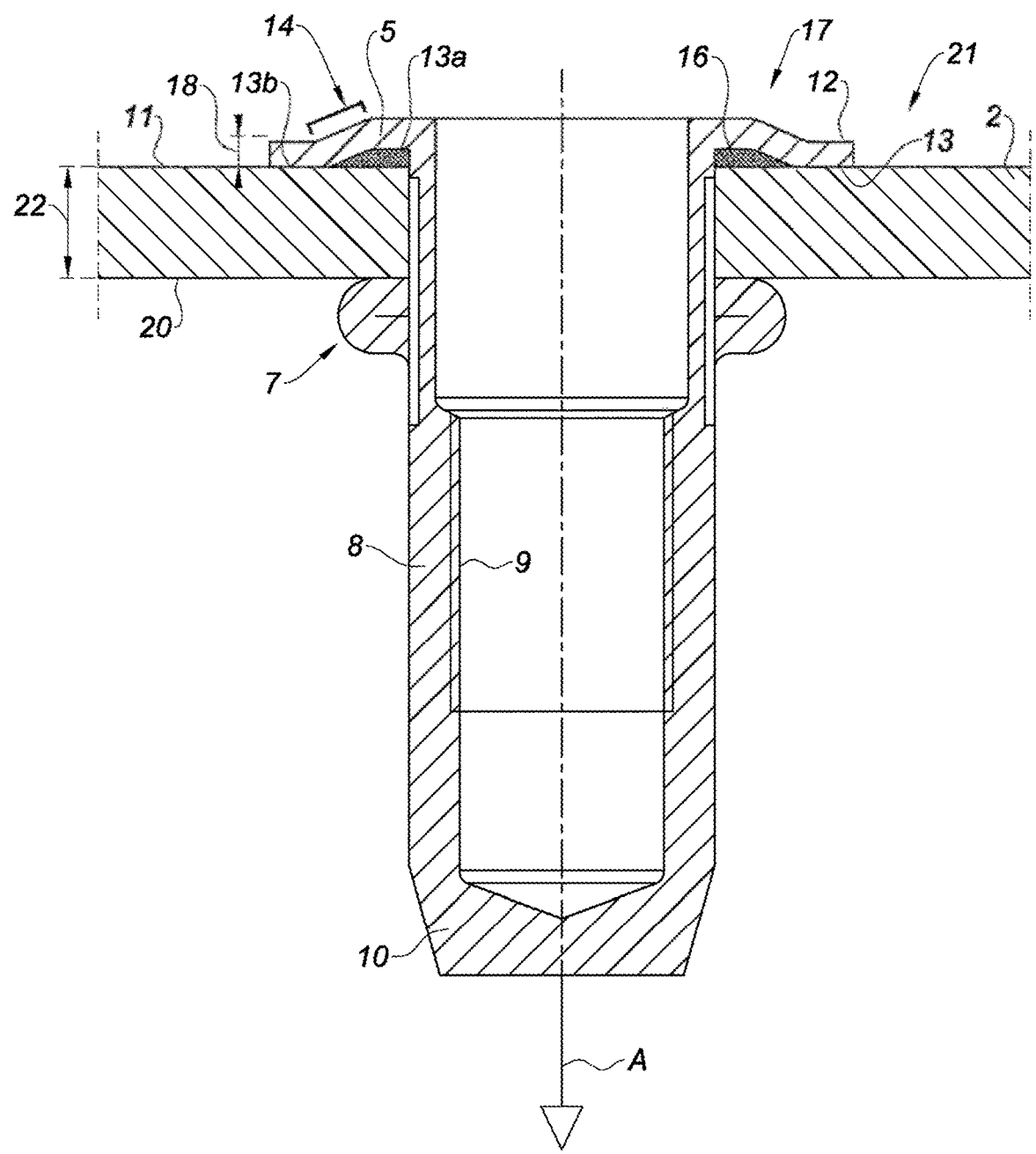
FIG. 2 schematically illustrates a cross-sectional view of the insert of FIG. 1 crimped on a support.

In FIGS. 1 and 2, an insert 1 to be crimped on a support 2 has been represented. The support 2 can be made from metal or from a composite material. Preferably, the insert 1 and support 2 are made from metal, for example steel.

The insert 1 can be a nut, a rivet, a screw or a stud, or a spacer. A nut is a tapped hollow part, i.e. which comprises an internal thread, designed to receive another threaded part. A rivet is a part for assembling flat parts, one end of which is bulged and the other end of which is crushed. A screw or a stud is a threaded part, i.e. comprising an external thread. A spacer is a connecting part designed to be placed transversely between the support 2 and a secondary part. A spacer in particular enables a constant separating distance to be kept between the support 2 and the secondary part. The spacer can also comprise a tapped section provided with an internal thread.

The insert 1 comprises a body 3 having a shank 4 and a flange 5. For example, the body 3 is a monoblock part. The shank 4 extends along a longitudinal axis A and comprises a crimping section 6 configured to deform into a crimping bead 7, illustrated in FIG. 2. The crimping bead 7 enables the insert 1 to be crimped on the support 2. The shank 4 is globally in the shape of a cylinder. What is meant here by a cylinder is a solid limited by a cylindrical surface generated by a line, called generatrix, running along a closed flat curve, called directrix, and two planes cutting the generatrices. The cylindrical surface of the shank 4 can present one or more faces so as to have a cross-section the outer edge of which is polygonal, for example hexagonal or square. The cylindrical surface of the shank 4 can have a cross-section the outer edge of which is oblong, for example elliptical. The body 3 preferably has the shape of a hollow cylinder demarcating a through or blind hole 7 at a distal end of the shank 4. The shank 4 can further comprise a tapped section 8 adjacent to the crimping section 6. The tapped section 8 comprises an internal thread 9 designed to receive a threaded part to be screwed onto the insert 1. The insert 1 thus comprises, in the order following a direction of the longitudinal axis, the flange 5, crimping section 6, tapped section 8 and a distal end 10 of the shank 4.

The flange 5 is designed to come into contact with a receiving surface 11 of the support 2 when the insert 1 is crimped on the support 2. The flange 5 extends along a transverse axis B. The transverse axis B is perpendicular to the longitudinal axis A. The flange 5 further presents a proximal surface 12 and a distal surface 13 opposite the proximal surface 12. The proximal surface 12 is oriented according to a direction opposite the direction of the longitudinal axis A of the shank 4. On the contrary, the distal surface 13 is oriented in the direction of the longitudinal axis A. In other words, the distal surface 13 is oriented in the direction of the crimping section 6. The flange 5 further presents a fold 14 forming a groove 15 situated on the distal surface 13. The groove 15 is designed to receive a seal 16. The seal 16 ensures tightness of a fixing assembly comprising the support 2, insert 1 and seal 16. In particular, the seal 16 ensures waterproofing against liquids such as water, oil, glycol, and more generally against gases such as air. The seal 16 is designed to be placed between the receiving surface 11 of the support 2 and the distal surface 13. For example, the seal 16 is made from a different material from that of the insert 1. In general manner, the seal 16 is made from deformable material, for example plastic or elastomer material, for example natural or synthetic rubbers. The seal has a generally toric shape. The seal 16 can be mounted on the insert 1 to form a fixing part 17.

The fold 14 of the flange 5 further enables the flange 5 to be in contact with the receiving surface 11 of the support 2 when the insert 1 is crimped on the support 2. More particularly, the distal surface 13 comprises a first part 13a on which the groove 15 is situated, and a second part 13b situated at one end of the flange 5 opposite the shank 4. The flange 5 comprises another opposite end in contact with the shank 4. The groove 15 is situated between the shank 4 and the second part 13b of the distal surface 13. Thus, when the insert 1 is crimped on the support 2, as illustrated in FIG. 2, the fold 14 enables contact to be maintained between the flange 5 and the receiving surface 11 of the support 2. Such a contact enables a constant pressure to be maintained with time and enhances the mechanical strength of the insert 1 on the support 2. The groove 15 further houses the seal 16 while preserving the contact between the two facing surfaces 13b, 11 and prevents the lift-off phenomenon of the flange 5 due to the spring effect of the seal 16 when the latter is compressed when crimping is performed. The mechanical strength of the insert 1 is thus enhanced while at the same time guaranteeing an efficient tightness.

More particularly, the flange 5 has a constant thickness 18. The groove 15 can therefore be achieved by folding of the flange 5. The folding also forms the fold 14. In other words, the flange 5 is deformed to form the fold 14 through an angle 19 determined with respect to the transverse axis B. Folding can be performed by compressing the flange 5 along the transverse axis B. It is also possible to use a matrix placed facing the distal surface to promote formation of the groove 15 when folding is performed. Due to the folding, a groove can be achieved without using a particular striking step of the flange 5. What is meant by constant thickness of the flange 5 is a thickness the value of which is kept constant along the transverse axis B. That is to say a first part of flange 5 joining the shank 4 at the level of the fold 14 has the same thickness as the second part of flange 5 joining the fold 14 at the end of the flange 5 opposite the shank 4. Advantageously, when folding is performed and by means of a suitable matrix, radial folds can be created located on the distal surface 13 extending from the shank 4 to the opposite end of the flange 5. These radial folds enable the flange 5 to be rigidified while at the same time preserving a constant thickness along the transverse axis B. Such a folding is particularly suitable when the flange 5 is of small thickness. What is meant by small thickness is a thickness 18 greater than or equal to 0.5 mm and strictly less than 2 mm. Preferably, the thickness 18 is strictly less than 1.5 mm. Indeed, when a groove is formed by striking on a flange having a small thickness, the striking tool may break as it is not suitable for small thicknesses. The stresses generated by the striking tool designed for larger thicknesses may in fact be greater than the breaking strength of the tool as the thickness of the flange is small and does not sufficiently absorb the energy generated by such stresses.

The insert 1 is an insert to be crimped, i.e. it is mounted on the support 2 by a crimping operation. Crimping consists in deforming the insert 1, by traction or pressing, for example in a press, at the distal end of the shank 4 to form the crimping bead 7, which comes into contact with the support 2 in order to wedge the support 2 between the flange 5 of the insert 1 and the crimping bead 7, enabling the insert 1 to be fixed onto the support 2. More particularly, the crimping bead 7 comes into contact with a surface 20 of the support 2 opposite the receiving surface 11.

In FIG. 2, a fixing assembly 21 comprising the support 2 and the fixing part 17 crimped onto the support 2 has also been represented. In particular, a hole is formed beforehand in the support 2 in order to insert the insert 1 to be crimped. The support 2 has a thickness 22 comprised between 0.5 and 8 mm inclusive.

Manufacturing methods of the insert 1, fixing part 17 and fixing assembly 21 as defined in the foregoing are in addition proposed. The manufacturing method of the insert 1 to be crimped on the support 2 comprises a step in which an insert is provided comprising a body having:

a shank extending along a longitudinal axis and comprising a crimping section configured to deform into a crimping bead to crimp the insert on the support, and a flange presenting a surface facing the crimping section and extending along an axis perpendicular to the longitudinal axis.

The method further comprises a folding step of the flange so as to preserve a constant thickness of the flange and to form a groove situated on the surface.

The manufacturing method of the fixing part 17 comprises a housing step of a seal 16 inside the groove 15 of the insert 1.

The manufacturing method of the fixing assembly comprises a crimping step of the fixing part on the support 2.

The component parts and their manufacturing methods which have been described above are particularly suitable for the automobile, naval or aeronautical industry, etc.

The invention claimed is:

1. An insert to be crimped on a support, comprising a body having:
   a shank extending along a longitudinal axis and comprising a crimping section configured to deform into a crimping bead to crimp the insert on the support, and
   a flange presenting a surface facing the crimping section and extending along an axis perpendicular to the longitudinal axis, the flange having a constant thickness and presenting a fold forming a groove situated on the surface and designed to receive a seal.

2. The insert according to claim 1, wherein the surface has a first part on which the groove is situated and a second part situated at one end of the flange opposite the shank, the second part being situated in front of the first part with is respect to the orientation of the surface.

3. The insert according to claim 1, wherein the thickness of the flange is greater than or equal to 0.5 mm and strictly less than 2 mm.

4. A fixing part, comprising an insert according to claim 1, and a seal housed in the groove of the insert.

5. A fixing assembly, comprising a fixing part according to claim 4 and a support on which the fixing part is crimped.

6. The fixing assembly according to claim 5, wherein the support has a thickness comprised between 0.5 and 8 mm inclusive.

7. A manufacturing method of an insert to be crimped on a support, comprising providing an insert including a body having:
   a shank extending along a longitudinal axis and comprising a crimping section configured to deform into a crimping bead to crimp the insert on the support, and
   a flange presenting a surface facing the crimping section and extending along an axis perpendicular to the longitudinal axis,
the method comprising folding of the flange so as to keep a constant thickness of the flange and to form a groove situated on the surface.

8. A manufacturing method of a fixing part, comprising manufacturing of an insert according to claim 7 and housing a seal in the groove of the insert.

9. A manufacturing method of a fixing assembly, comprising manufacturing of a fixing part according to claim 8 and crimping the fixing part on a support.

* * * * *